US009376038B2

(12) United States Patent
Seto et al.

(10) Patent No.: US 9,376,038 B2
(45) Date of Patent: Jun. 28, 2016

(54) SEAT LOCK APPARATUS (71) Applicant: Mitsui Kinzoku Act Corporation, Kanagawa (JP)

(72) Inventors: Naoya Seto, Yokohama (JP); Naoki Hanaki, Yokohama (JP); Kazuhito Yokomori, Yokohama (JP)

(73) Assignee: MITSUI KINZOKU ACT CORPORATION, Yokohama-Shi (JP)

( * ) Notice: Subject to any disclaimer, the term of this patent is extended or adjusted under 35 U.S.C. 154(b) by 0 days.

(21) Appl. No.: 14/340,052

(22) Filed: Jul. 24, 2014

(65) Prior Publication Data
US 2015/0028618 A1    Jan. 29, 2015

(30) Foreign Application Priority Data

Jul. 26, 2013 (JP) .................................. 2013-155748

(51) Int. Cl.
*B60N 2/20* (2006.01)
*B60N 2/36* (2006.01)

(52) U.S. Cl.
CPC ............. *B60N 2/366* (2013.01); *B60N 2205/35* (2013.01)

(58) Field of Classification Search
CPC .. B60N 2/366; B60N 2205/35; B60N 2/2245; B60N 2/3097; B60R 5/04
USPC .................. 296/65.03, 65.09, 65.16
See application file for complete search history.

(56) References Cited

U.S. PATENT DOCUMENTS

| 6,733,078 | B1* | 5/2004 | Zelmanov ................... 297/378.1 |
| 7,338,128 | B2* | 3/2008 | Inoue et al. ............. 297/378.13 |
| 7,959,205 | B2* | 6/2011 | Paing et al. ................. 296/65.03 |
| 8,894,107 | B2* | 11/2014 | Kamata et al. ................ 292/216 |
| 2008/0296948 | A1* | 12/2008 | Tanaka ........................... 297/353 |
| 2013/0307307 | A1* | 11/2013 | Muller et al. ............ 297/354.12 |
| 2014/0169873 | A1 | 6/2014 | Kamata et al. |

FOREIGN PATENT DOCUMENTS

| CN | 101445068 A | 6/2009 |
| JP | 05-157023 | 3/2013 |
| WO | WO-2013/021679 | 2/2013 |

OTHER PUBLICATIONS

Office Action for Chinese Patent Application No. 201410353948.5 mailed Mar. 8, 2016.

* cited by examiner

*Primary Examiner* — Jason S Morrow
*Assistant Examiner* — E Turner Hicks
(74) *Attorney, Agent, or Firm* — Foley & Lardner LLP (57) ABSTRACT A seat lock apparatus includes a case member having a striker entrance groove and a hook lever that is provided rotatably via a hook shaft and is movable between an opening position and a restraining position where the hook lever closes an opening in a striker entrance groove. The apparatus is configured to position the hook lever in the restraining position while positioning the striker in the striker entrance groove when a seatback is erected. The striker entrance groove is formed such that when the striker enters the striker entrance groove and abuts against the hook lever positioned in the restraining position, only a portion of the case member, which is positioned closer to a central side of the seatback than the hook lever is in an axial direction of the hook shaft, is brought into abutment with the striker.

6 Claims, 9 Drawing Sheets

SEAT LOCK APPARATUS

This application claims priority from Japanese Patent Application No. 2013-155748 filed on Jul. 26, 2013, the entire subject-matter of which is incorporated herein by reference.

BACKGROUND OF THE INVENTION

1. Field of the Invention

The present invention relates to a seat lock apparatus for a seat in which either one of a sitting side cushion and a backrest side cushion is configured as a movable cushion which can move relative to a vehicle main body, the seat lock apparatus being configured to hold the movable cushion to the vehicle main body.

2. Description of the Related Art

In vehicle seats of four-wheeled motor vehicles, there are some vehicle seats which include a sitting side cushion (hereinafter, referred to as a "seat cushion") and a backrest side cushion (hereinafter, referred to as a "seatback") and in which the seatback is configured as a movable cushion which can move relative to a vehicle main body. In the seats of this type, when the seatback that is the movable cushion is erected to be held to the vehicle main body, an occupant can sit on the seat cushion, while when the seatback is folded down to move away from the vehicle main body, a further storage space is obtained. Normally, in a seat in which a seat cushion is configured as a movable cushion, a seat lock apparatus is provided on either one of a seatback or the vehicle main body. The seat lock apparatus is configured to hold the seatback in an erected state by restraining a striker which is provided on the other one of the seatback and the vehicle main body when the seatback is erected.

In the seat lock apparatus, there are provided a case member which has a striker entrance groove which the striker enters and a hook lever which is supported rotatably on a hook shaft which is provided on the case member. The hook lever moves between an opening position where the hook lever opens an opening of the striker entrance groove and a restraining position where the hook lever closes the opening of the striker entrance groove. In the seat lock apparatus configured in the way described above, when the seatback is positioned in the erected state, the striker which enters the striker entrance groove is held by the hook lever which is positioned in the restraining position and deepest surface portions of the striker entrance groove which are situated on both sides of the hook lever (for example, refer to Japanese Patent No. 5157023). This prevents the disengagement of the striker from the striker entrance groove, whereby the seatback is held in the erected state, and the seat is held in a sitting state.

SUMMARY OF THE INVENTION

In many cases, the seat lock apparatus and the striker are provided at an end portion of the movable cushion (seatback). Specifically, since a seatback of a rear seat is configured so as to ensure as much space as possible which can help to extend the luggage space in a rear luggage compartment or trunk, in many cases, the seatback which is erected is supported on the vehicle main body only at both end portions thereof.

However, when the seatback deflects due to a pressing load being applied to the seatback, for example, as a result of a rear seat passenger leaning back in the rear seat, the striker is inclined relative to the case member, and one of the deepest surface portions of the striker entrance groove is spaced apart from the striker. Thereafter, when the seatback is restored to its original state as a result of the pressing load being removed, the striker is brought into contact again with the deepest surface portion of the striker entrance groove, and there is caused a fear that the re-contact of these two components calls for a problem that a striking noise is generated then.

In addition, in some vehicle seats of four-wheeled motor vehicles, a seat cushion is configured as a movable cushion. In the seats of this type, the passenger can be seated on the seat by folding the seat cushion on to the floor of the vehicle main body to hold it to the vehicle main body, while the seat cushion is erected to be put in a stowed state. In the seat in which the seat cushion is configured as the movable cushion, the seat lock apparatus and the striker, described above are provided at an end portion of the seat cushion to maintain the sitting state. When the seat lock apparatus and the striker are provided at the end portion of the seat cushion, too, when a pressing load is applied to the seat cushion, for example, as a result of the passenger being seated on the seat, the seat cushion deflects. Because of this, there may be caused a fear that the generation of a striking noise is called for when the seat cushion is restored to its original state as a result of the pressing load being removed.

Therefore, illustrative aspects of the invention provide a seat lock apparatus which can prevent the generation of a striking noise even though a pressing load is applied to the movable cushion of the seat which is positioned in the sitting state.

According to a first illustrative aspect of the invention, there may be provided a seat lock apparatus applicable to a seat, wherein the seat comprises a sitting side cushion and a backrest side cushion, either one of which is configured as a movable cushion that is movable relative to a vehicle main body, and wherein the seat is put in a sitting state in a case where the movable cushion is held to the vehicle main body and is put in a stowed state in a case where the movable cushion is moved away from the vehicle main body, the seat lock apparatus comprising: a case member, which is provided on either one of an end portion of the movable cushion and the vehicle main body, and which comprises a striker entrance groove, wherein a striker provided on the other one of the end portion of the movable cushion and the vehicle main body enters the striker entrance groove when the seat is put in the sitting state; and a hook lever that is provided rotatably in the case member via a hook shaft and is configured to be movable between an opening position where the hook lever opens an opening in the striker entrance groove and a restraining position where the hook lever closes the opening in the striker entrance groove. The seat lock apparatus may be configured to hold the striker, which has entered the striker entrance groove in a case of putting the seat in the sitting state, by the case member and the hook lever that is positioned in the restraining position to hold the movable cushion to the vehicle main body so as to maintain the sitting state. The striker entrance groove may be formed such that only a portion of the case member, which is positioned closer to a central side of the movable cushion than the hook lever is to the central side of the movable cushion in an axial direction of the hook shaft, is brought into abutment with the striker in the case where the striker is held by the case member and the hook lever positioned in the restraining position.

According to a second illustrative aspect of the invention, in the seat lock apparatus according to the first illustrative aspect, the case member may comprise: a first striker entrance groove that is positioned on one side of the hook lever in the axial direction of the hook shaft; and a second striker entrance groove that is positioned on the other side of the hook lever in the axial direction of the hook shaft. The first striker entrance groove may be formed such that the striker is brought into abutment with the case member in a case where the striker enters the first striker entrance groove to be brought into abutment with the hook lever that is positioned in the restraining position. The second striker entrance groove may be formed such that a distance from a striker entrance surface, which configures a striker entrance port of the case member, to a deepest surface portion of the second striker entrance groove is longer than a distance from the striker entrance surface to a deepest surface portion of the first striker entrance groove. The second striker entrance groove may be formed to have a width which permits the striker to move to and reach the deepest surface portion of the first striker entrance groove. The first striker entrance groove may be positioned closer to the central side of the movable cushion than the hook lever is to the central side of the movable cushion.

According to a third illustrative aspect of the invention, in the seat lock apparatus according to the second illustrative aspect, the case member may comprise a body made from resin, and the first striker entrance groove may be formed in the body.

According to a fourth illustrative aspect of the invention, the seat lock apparatus according to the second illustrative aspect may further comprise an opening lever provided between the first striker entrance groove and the second striker entrance groove in the axial direction of the hook shaft and configured to move the hook lever, which is positioned in the restraining position, to the opening position. The hook lever may be positioned between the opening lever and the second striker entrance groove in the axial direction of the hook shaft.

The seat lock apparatus according to the illustrative aspects of the invention is applied to the seat in which either one of the sitting side cushion and the backrest side cushion is configured as the movable cushion which can move relative to the vehicle main body, and in the case where the movable cushion is held to the vehicle main body, the seat is put in the sitting state, while in the case where the movable cushion is moved away from the vehicle main body, the seat is put in the stowed state. In addition, the seat lock apparatus according to the invention is configured to hold the striker, which has entered the striker entrance groove in the case of putting the seat in the sitting state, by the case member and the hook lever that is positioned in the restraining position to thereby hold the movable cushion to the vehicle main body. In this seat lock apparatus, the striker entrance grooves are formed such that only the portion of the case member which is positioned closer to the central side of the movable cushion than the hook lever is to the central side in the axial direction of the hook shaft is brought into abutment with the striker in the case where the striker is held by the case member and the hook lever that is positioned in the restraining position. In the seat lock apparatus configured in the way described above, when the striker is held, the movable cushion deflects due to the pressing load and the striker is inclined relative to the case member. However, in this seat lock apparatus, even if the deflection of the movable cushion occurs, the portion of the case member that is in abutment with the striker does not move away from the striker. According thereto, when the movable cushion is restored to its original state as a result of the pressing load being removed, the portion of the case member that is spaced away from the striker is not brought into abutment with the striker. Consequently, according to the seat lock apparatus according to the invention, it is possible to prevent the generation of a striking noise even when the pressing load is applied to the movable cushion of the seat which is in the sitting state.

DETAILED DESCRIPTION

Hereinbelow, referring to the drawings, an illustrative embodiment of a seat lock apparatus according to the invention will be described in detail. In all the drawings for describing this illustrative embodiment, like reference numerals will be given to those which have the same functions, a repeated description thereof will be omitted.

Figure 1:
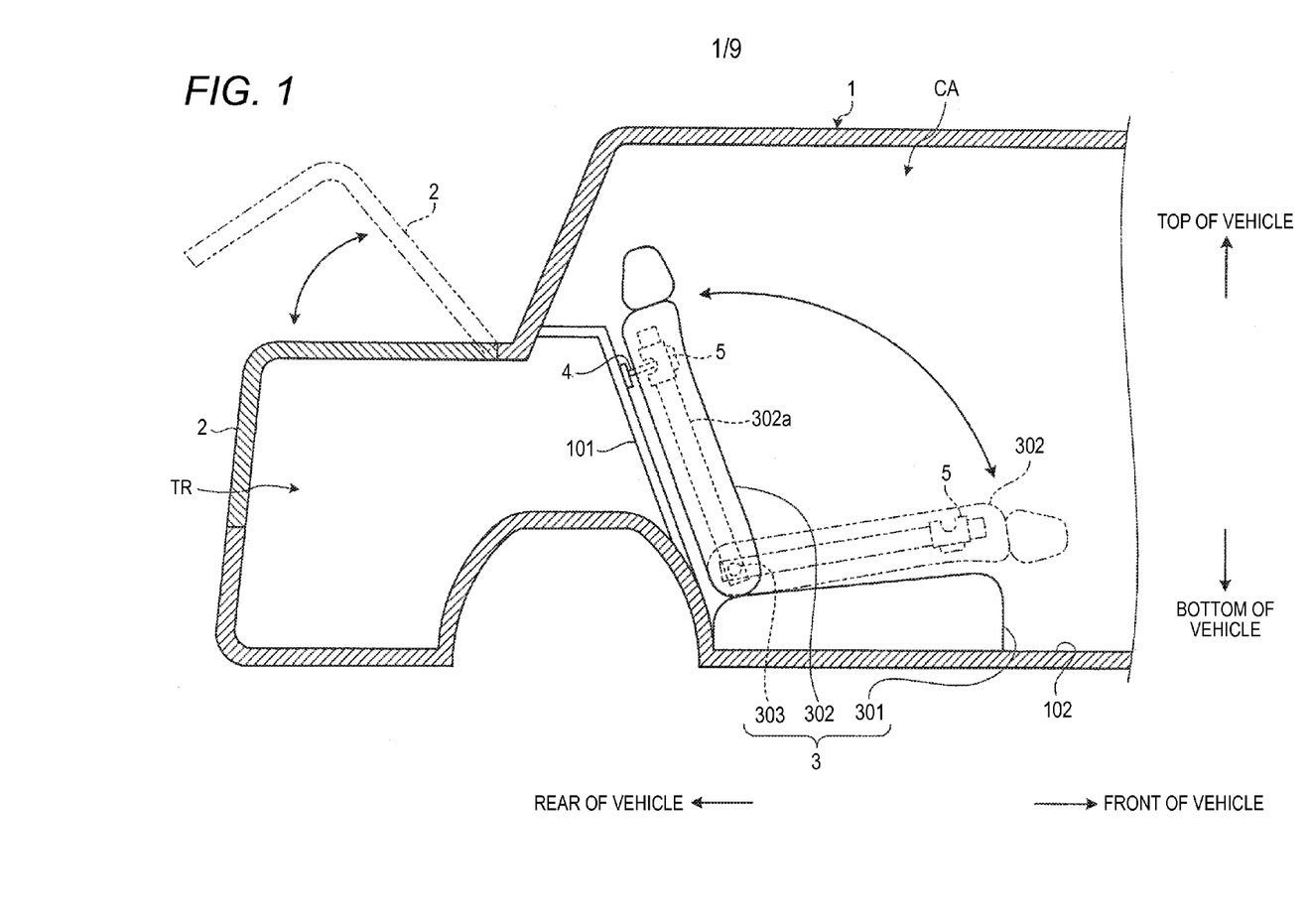
FIG. 1 is a sectional view of a vehicle to which a seat lock apparatus according to an illustrative embodiment of the invention is applied.
Figure 2:
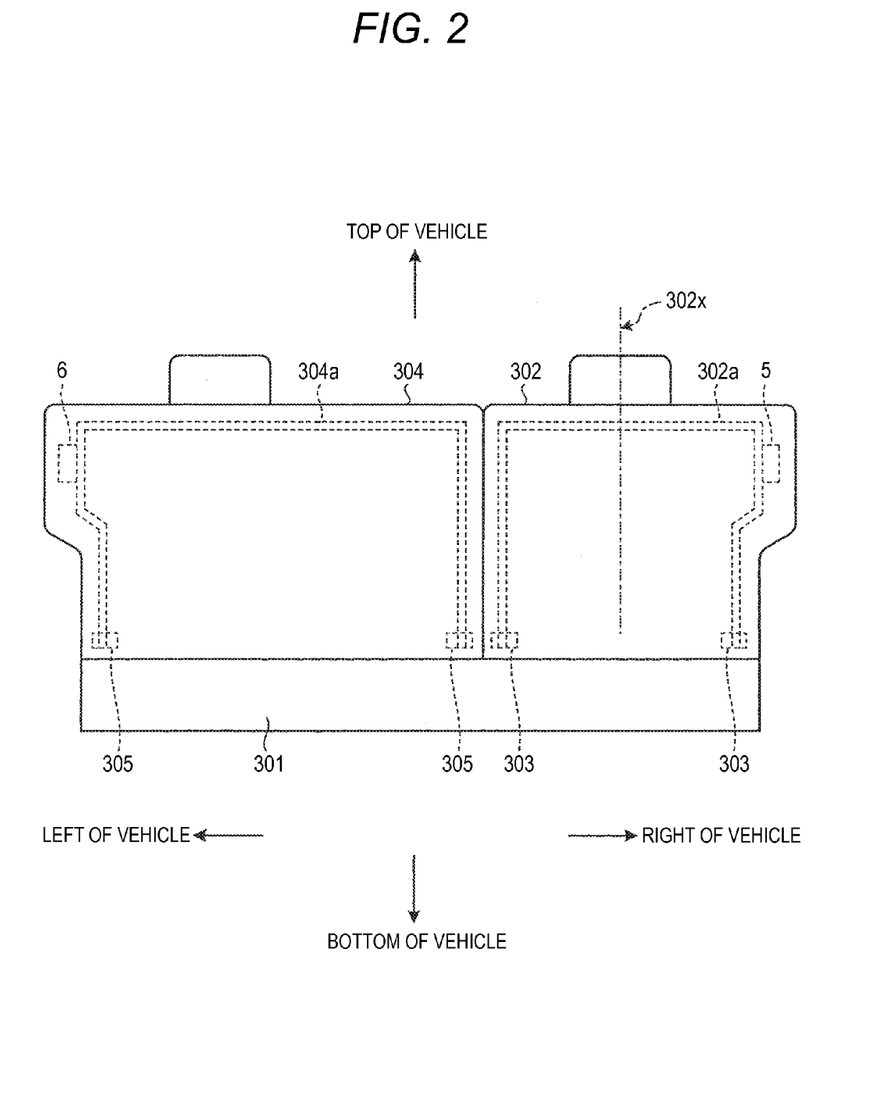
FIG. 2 is a view of a rear seat as seen from a rear side of the vehicle with a seatback thereof erected.

FIG. 1 is a sectional view of a vehicle to which a seat lock apparatus according to an illustrative embodiment of the invention is applied. FIG. 2 is a view of a rear seat as seen from a rear side of the vehicle with a seatback erected.

In this illustrative embodiment, as an application example of a seat lock apparatus according to the invention, a seat lock apparatus will be described as being applied to a seatback of a rear seat of a vehicle which has an internal trunk access function. In the vehicle which has the internal trunk access function, as shown in FIG. 1, the trunk TR is provided at a rear side of a passenger compartment CA of a vehicle main body 1. In the vehicle main body 1, an opening portion is provided in an upper side of the trunk TR, and a trunk lid 2 is attached to the trunk TR so as to open and close the opening portion.

The passenger compartment CA and the trunk TR of the vehicle main body 1 communicate with each other by forming an opening portion (not shown) in a frame member 101 which is situated on a boundary therebetween. The opening portion in the frame member 101 is closed by positioning a seatback 302 of a rear seat 3 in an erected state (a position which is indicated by solid lines in FIG. 1) in which the seatback 302 is erected relative to a floor surface 102 of the vehicle main body 1.

The rear seat 3 is a seat which is placed at a rear end portion of the passenger compartment CA and includes a seat cushion (a sitting side cushion 301) and a seatback (a backrest side cushion) 302. The seat cushion 301 is fixed to the floor surface 102 of the vehicle main body 1. The seatback 302 is connected to the seat cushion 301 by hinges 303 and can be moved in a front-to-rear direction of the vehicle on the hinges 303 as fulcrums. This rear seat 3 is put in a sitting state by erecting the seatback 302 which is a movable cushion and holding the seatback 302 to the vehicle main body 1 in such an erected state. On the other hand, the rear seat 3 is put in a stowed state by folding down the seatback towards the seat cushion 301 (a position indicated by two-dot chain lines in FIG. 1) so as to be superposed on the seat cushion 301. When the rear seat 3 is put in the stowed state, a communication between the trunk TR and the passenger compartment CA is established, whereby the internal trunk access function can be used. As shown in FIG. 2, two seatbacks 302, 304 are aligned side by side in a left-to-right direction of the vehicle on the rear seat 3. The seatback 304 is connected to the seat cushion 301 by hinges 305. According thereto, the seatback 302 and the seatback 304 can be moved in the front-to-rear direction of the vehicle in an independent fashion.

Of the seatbacks 302, 304, a seat lock apparatus 5 adapted to restrain a striker 4 provided on the vehicle main body 1 is mounted on the seatback 302 which is positioned on a right-hand side of the vehicle. As shown in FIG. 2, the seat lock apparatus 5 is mounted in a position which is at a right end portion of the seatback 302 in the left-to-right direction of the vehicle and at an upper end side of the seatback 302. This seat lock apparatus 5 is mounted on a seatback frame 302a which is incorporated in the seatback 302. In this illustrative embodiment, the seat lock apparatus 5 is mounted on a surface of the seatback frame 302a which faces outboards (rightwards) in the left-to-right direction of the vehicle. The striker 4 which is restrained by the seat lock apparatus 5 is provided in a position where the striker 4 can enter a striker entering groove of the seat lock apparatus 5 in the case where the seatback 302 is put in the erected state as shown in FIG. 1. This striker 4 is provided on the frame member 101 of the vehicle main body 1 so as to project obliquely upwards to a front side of the vehicle from a surface which lies opposite to the seat lock apparatus 5.

On the other hand, a seat lock apparatus 6 adapted to restrain a striker 4 provided on the vehicle main body 1 is provided on the seatback 304 which is positioned on a left-hand side of the vehicle. As shown in FIG. 2, the seat lock apparatus 6 is mounted in a position at a left end portion of the seatback 304 in the left-to-right direction of the vehicle and at an upper end side of the seatback 304. This seat lock apparatus 6 is mounted on a seatback frame 304a which is incorporated in the seatback 304. In this illustrative embodiment, the seat lock apparatus 6 is mounted on a surface of the seatback frame 304a which faces outboards (leftwards) in the left-to-right direction of the vehicle. The striker 4 is provided in a position where the striker 4 can enter a striker entering groove of the seat lock apparatus 6 in the case where the seatback 304 is put in the erected state. This striker 4 is provided on the frame member 101 of the vehicle main body 1 so as to project obliquely upwards to the front side of the vehicle from a surface which lies opposite to the seat lock apparatus 6.

The seat lock apparatus 5 which is mounted on the seatback 302 and the seat lock apparatus 6 which is mounted on the seatback 304 are in such a positional relationship that the respective members of the seat lock apparatuses 5, 6 are positioned in reversed positions as viewed in the left-to-right direction of the vehicle in such a state that the seat lock apparatuses 5, 6 are mounted on the corresponding seatbacks. Hereinafter, the configuration and mounting method of the seat lock apparatus will be described by taking the seat lock apparatus 5 mounted on the seatback 302 for example.

Figure 3:
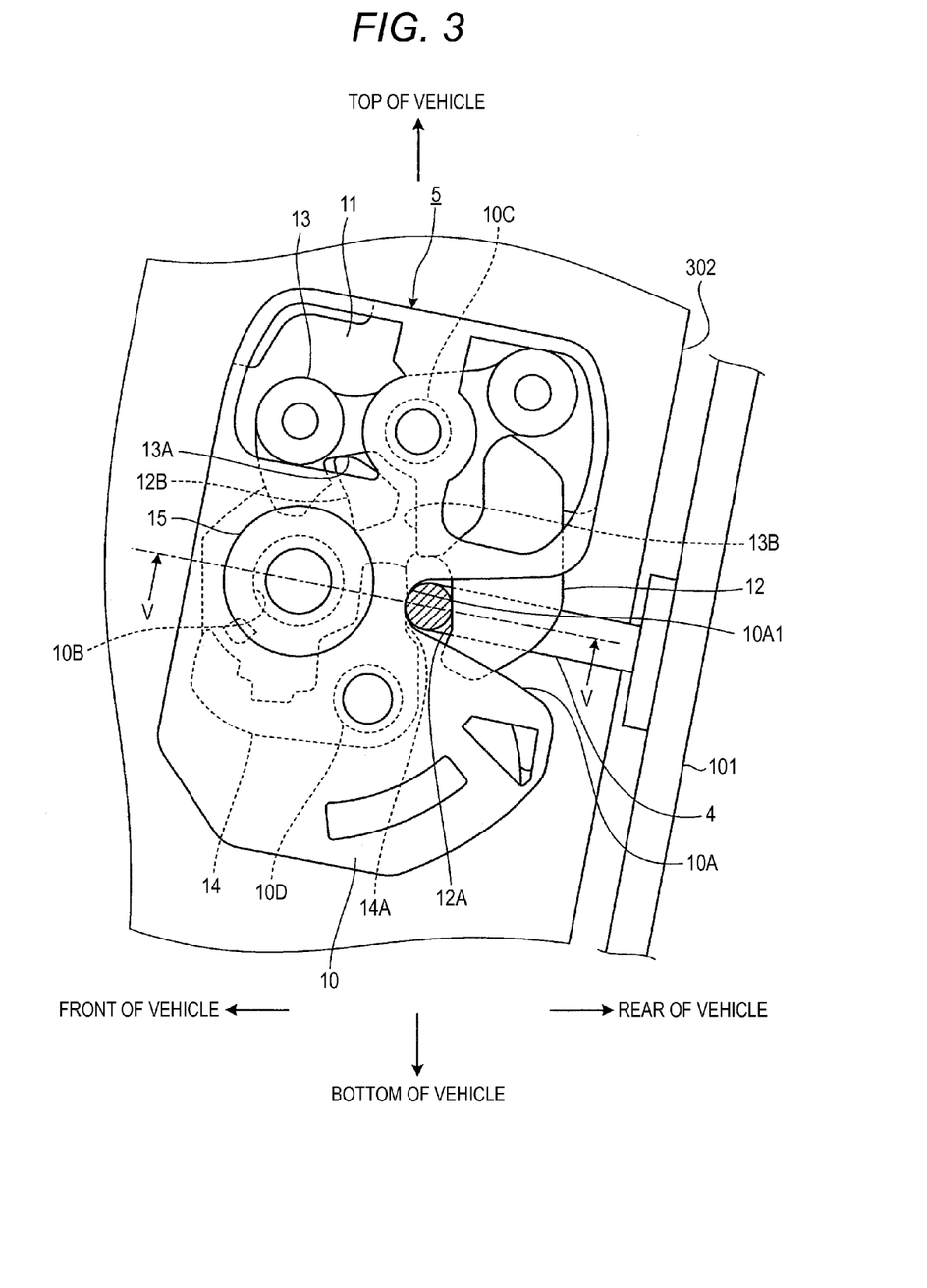
FIG. 3 is a side view of the seat lock apparatus as viewed from a left-hand side of the vehicle with a striker restrained.
Figure 4:
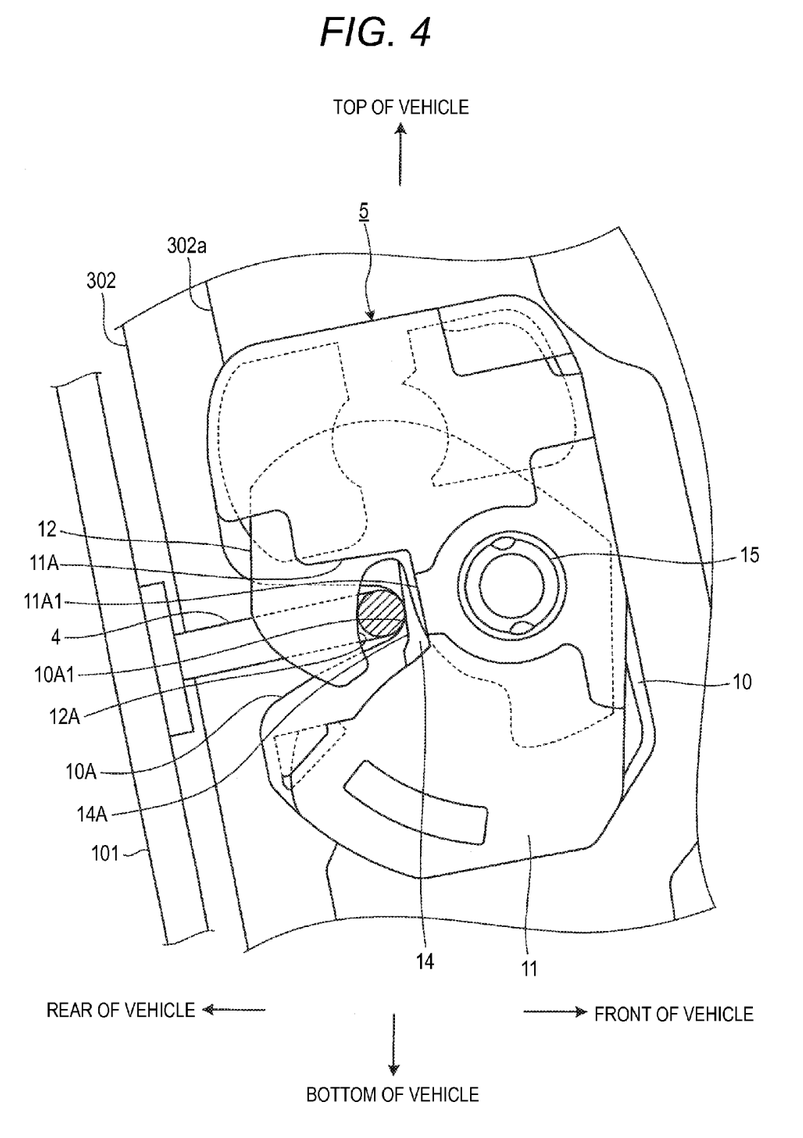
FIG. 4 is a side view of the seat lock apparatus shown in FIG. 3 as seen from a right-hand side of the vehicle.
Figure 5:
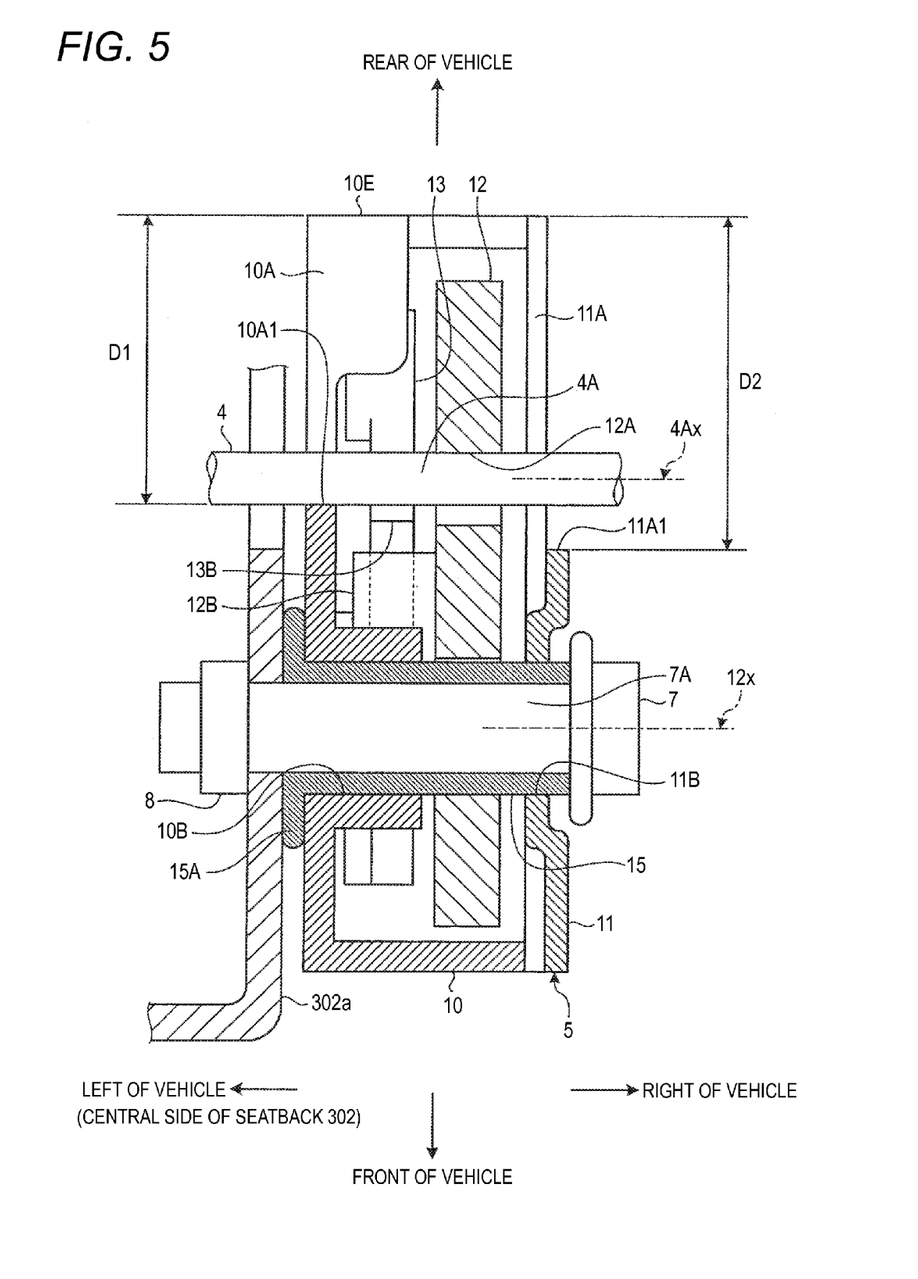
FIG. 5 is a sectional view taken along the line V-V in FIG. 3.
Figure 6:
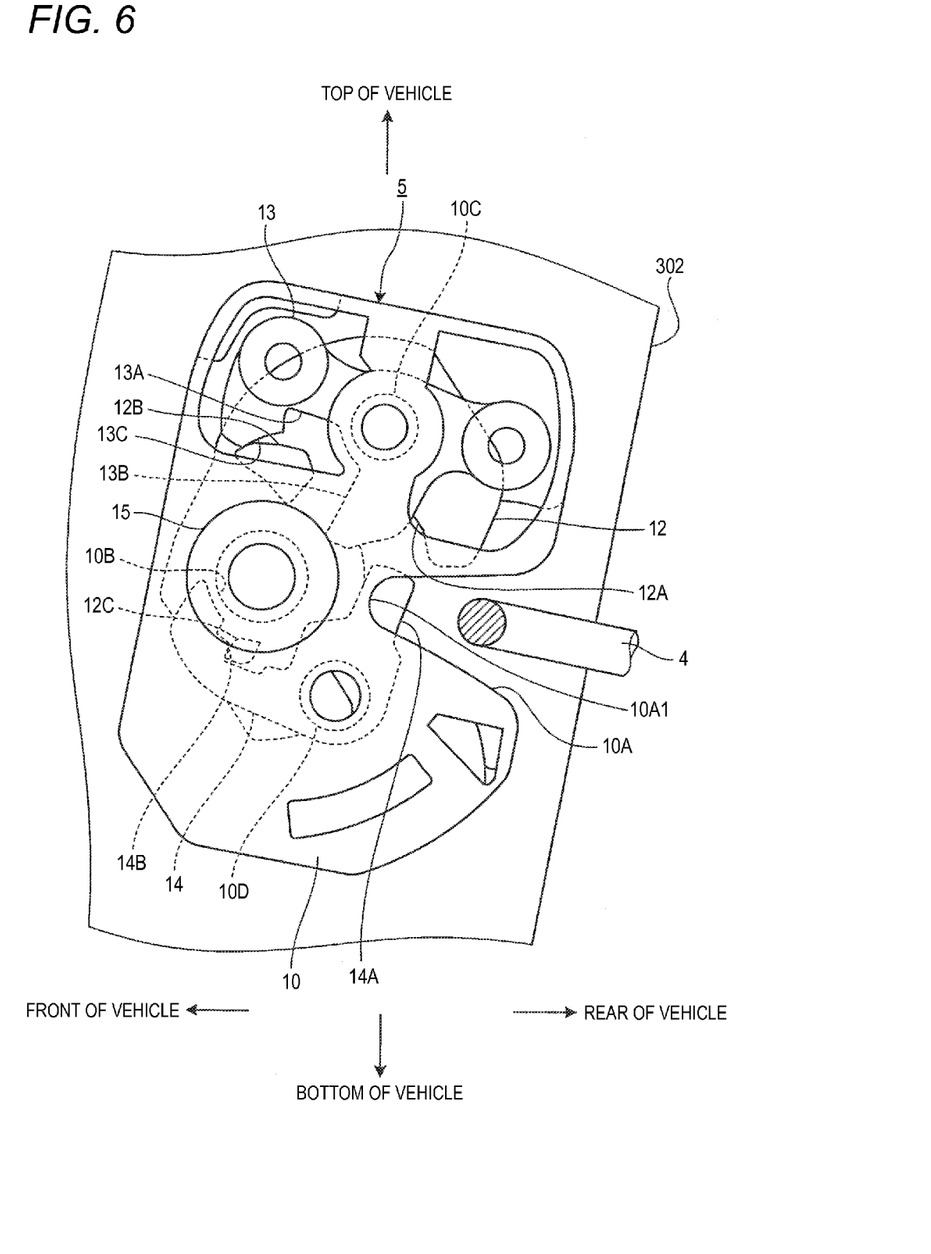
FIG. 6 is a side view of the seat lock apparatus as seen from the left-hand side of the vehicle with the striker released.

FIG. 3 is a side view of the seat lock apparatus as viewed from a left-hand side of the vehicle with the striker restrained thereby. FIG. 4 is a side view of the seat lock apparatus shown in FIG. 3 as viewed from a right-hand side of the vehicle. FIG. 5 is a sectional view taken along the line V-V in FIG. 3. FIG. 6 is a side view of the seat lock apparatus as viewed from the left-hand side of the vehicle with the striker released.

As shown in FIGS. 3 to 5, the seat lock apparatus 5 includes a body 10, a base plate 11, a hook lever 12, an opening lever 13, a guide lever 14 and a hook shaft 15.

The body 10 and the base plate 11 make up a case member which accommodates the hook lever 12, the opening lever 13, the guide lever 14 and the like. The body 10 is a resin member which is approximately molded into a box shape. A first striker entrance groove 10A, a hook shaft insertion hole 10B, an opening lever support shaft 10C and a guide lever support shaft 10D are provided in and on a bottom surface of the body 10. The first striker entrance groove 10A is a groove which the striker 4 enters. A deepest surface portion 10A1 of the first striker entrance groove 10A is shaped such that with the hook lever 12 positioned in a restraining position, which will be described later, the striker 4 is brought into abutment with the deepest surface portion 10A1 so that the striker 4 can be held by the deepest surface portion 10A1 and the hook lever 12 therebetween. The hook shaft insertion hole 10B is a hole through which the hook shaft 15 is inserted as shown in FIG. 5. The hook shaft 15 is a member which supports the hook lever 12 rotatably, as will be described later. The opening lever support shaft 10C is a cylindrical shaft which supports the opening lever 13 rotatably. The guide lever support shaft 10D is a cylindrical shaft which supports the guide lever 14 rotatably. The hook shaft insertion hole 10B, the opening lever support shaft 10C and the guide lever support shaft 10D are formed such that their axial directions intersect the bottom surface of the body 10 at right angles. The base plate 11 is a metallic plate which covers an open end portion of the body 10 which lies opposite to the bottom surface thereof. A second striker entrance groove 11A and a hook shaft insertion hole 11B are provided on and in the base plate 11. The second striker entrance groove 11A is a groove which the striker 4 enters. The hook shaft insertion hole 11B is a hole through which the hook shaft 15 is inserted.

As shown in FIGS. 4 and 5, in the seat lock apparatus 5 of this illustrative embodiment, a distance D2 from a striker entrance surface 10E of the body 10 (the case member) which configures a striker entrance port of the striker 4 to a deepest surface portion 11A1 of the second striker entrance groove 11A is made longer than a distance D1 from the striker entrance surface 10E to the deepest surface portion 10A1 of the first striker entrance groove 10A. In addition, the second striker entrance groove 11A has a width which permits the striker 4 to move to the deepest surface portion 10A1 of the first striker entrance groove 10A without being brought into abutment with the second striker entrance groove 11A. For example, as shown in FIGS. 3 and 4, the width of the second striker entrance groove 11A is larger than a width of the deepest surface portion 10A1 of the first striker entrance groove 10A. Also, a width of the deepest surface portion 11A1 of the second striker entrance groove 11A is larger than the width of the deepest surface portion 10A1 of the first striker entrance groove 10A. The distance D2 and width of the second striker entrance groove 11A take, for example, values which prevent a restrained portion 4A of the striker 4 which is restrained by the seat lock apparatus 5 from being brought into abutment with the base plate 11 even though an axis 4Ax of the restrained portion 4A is inclined from a state in which the axis 4Ax is parallel to a rotating axis 12x of the hook lever 12 (a state shown in FIG. 5) towards the deepest surface portion 11A1 of the second striker entrance groove 11A.

The hook lever 12 is supported rotatably on the hook shaft 15 which is inserted through the hook shaft insertion hole 10B in the body 10 and the hook shaft insertion hole 11B in the base plate 11. This hook lever 12 moves between the restraining position (the position shown in FIG. 3) where the hook lever 12 lies across the first striker entrance groove 10A to close the opening of the first striker entrance groove 10A and an opening position (a position shown in FIG. 6) where the hook lever 12 releases the closure of the opening of the first striker entrance groove 10A. In addition, the hook lever 12 is biased in a direction in which the hook lever 12 moves from the opening position to the restraining position (a clockwise direction in FIG. 3) by a spring, not shown, and moves to the restraining position when the striker 4 enters the first striker entrance groove 10A to reach the deepest surface portion 10A1 thereof. When the hook lever 12 is positioned in the restraining position, as shown in FIG. 3, the striker 4 is brought into abutment with an engagement surface 12A of a hook portion (not shown) which lies across the first striker entrance groove 10A, whereby the striker 4 is restricted from moving in a direction in which the striker 4 is disengaged from the first striker entrance groove 10A. Additionally, the striker 4 which is in abutment with the engagement surface 12A of the hook lever 12 which is in the restraining position is held by the hook lever 12 and the body 10 therebetween in such a state that the striker 4 is in abutment with only the deepest surface portion 10A1 of the first striker entrance groove 10A of the body 10 as shown in FIG. 5.

The opening lever 13 is a lever which moves the hook lever 12 from the restraining position to the opening position and is supported rotatably on the opening lever support shaft 10C. As shown in FIG. 5, the opening lever 13 is provided in a position which lies between the hook lever 12 and the first striker entrance groove 10A in an axial direction of the hook shaft 15. Additionally, the opening lever 13 is biased in a counterclockwise direction in FIG. 3 by a spring, not shown. When the hook lever 12 is positioned in the restraining position, a first engagement portion 13A of the opening lever 13 is held in a position where the first engagement portion 13A is in engagement with an indicating projecting portion 12B of the hook lever 12.

The guide lever 14 is a lever which holds the hook lever 12 in the opening position and is supported rotatably on the guide lever support shaft 10D. This guide lever 14 is provided in a position which lies between the hook lever 12 and the first striker entrance groove 10A in the axial direction of the hook shaft 15. In addition, the guide lever 14 is biased in a clockwise direction in FIG. 3 by a spring, not shown. When the hook lever 12 is in the restraining position, a striker abutment portion 14A of the guide lever 14 is held in a position which recedes from the first striker entrance groove 10A due to a pressing load which the guide lever 14 receives from the striker 4.

In the hook shaft 15, a flange 15A is provided at one end of a cylindrical member which supports the hook lever 12, and the hook shaft 15 is inserted rotatably through the hook shaft insertion hole 10B in the body 10 and the hook shaft insertion hole 11B in the base plate 11. This hook shaft 15 also functions as a mounting portion when the seat lock apparatus 5 is mounted on the seatback frame 302a of the seatback 302. As shown in FIG. 5, a shaft 7A of a bolt 7 is inserted through the hook shaft 15 and a through hole (not shown) of the seatback frame 302a and is fixedly fastened with a nut 8, whereby the seat lock apparatus 5 is mounted rotatably on the seatback frame 302a. In this illustrative embodiment, as shown in FIG. 5, the hook shaft 15 is provided in such an orientation that the flange 15A is positioned on an outside of the bottom surface of the body 10. In addition, the seat lock apparatus 5 is mounted on the seatback frame 302a in such a state that the body 10 is spaced apart from the seatback frame 302a due to the presence of the flange 15A. Namely, as shown in FIGS. 2 and 5, the seat lock apparatus 5 is mounted on the seatback frame 302a in such an orientation that the first striker entrance groove 10A is positioned closer to a center 302x of the seatback 302 than the hook lever 12 is to the center 302x in the axial direction of the hook shaft 15 (in the left-to-right direction of the vehicle).

In releasing the striker 4 which is restrained by the seat lock apparatus 5 described above, the opening lever 13 is rotated in the clockwise direction in FIG. 3. By doing so, a pressing portion 13B of the opening lever 13 presses against the indicating projecting portion 12B of the hook lever 12, whereby the hook lever 12 rotates in the counterclockwise direction in FIG. 3. When the rotating hook lever 12 approaches the opening position shown in FIG. 6 to thereby open the opening in the first striker entrance groove 10A, the engagement of the engagement surface 12A of the hook lever 12 with the striker 4 is released. Then, when the hook lever 12 rotates to the opening position, the guide lever 14 rotates in the clockwise direction as shown in FIG. 6, and the striker abutment portion 14A enters the first striker entrance groove 10A. The entrance of the guide lever 14 into the first striker entrance groove 10A pushes out the striker 4 in a direction in which the striker 4 is disengaged from the first striker entrance groove 10A. Additionally, when the guide lever 14 moves to a position shown in FIG. 6, a hook engaging portion 14B of the guide lever 14 is brought into engagement with an engaging projection 12C of the hook lever 12, whereby the hook lever 12 is held in the opening position. Thereafter, the opening lever 13 stops rotating in the clockwise direction in FIG. 6 and then rotates in the counterclockwise direction, and as shown in FIG. 6, a second engagement portion 13C is held in a position where the second engagement portion 13C is in engagement with the indicating projecting portion 12B of the hook lever 12. The seatback 302 can be folded down towards a front side of the vehicle by releasing the striker 4 by doing the series of operations described heretofore.

In addition, when the seatback 302 is moved to a rear side of the vehicle while the seat lock apparatus 5 and the striker 4 stay in the positional relationship shown in FIG. 6, the striker 4 moves towards the deepest surface portion 10A1 of the first striker entrance groove 10A. Then, when the striker 4 presses against the striker abutment portion 14A of the guide lever 14, the guide lever 14 rotates in the counterclockwise direction in FIG. 6, whereby the engagement of the hook engagement portion 14B of the guide lever 14 with the engaging projection 12C of the hook lever 12 is released. Then, the hook lever 12 rotates in the clockwise direction in FIG. 6 to move to the restraining position shown in FIG. 3. At the same time, the guide lever 14 rotates in the counterclockwise direction in FIG. 6 to move to the position shown in FIG. 3. Performing the series of operations causes the hook lever 12 and the deepest surface portion 10A1 of the first striker entrance groove 10A to hold to restrain the striker 4, whereby the seatback 302 can be held in the erected state.

Figure 7:
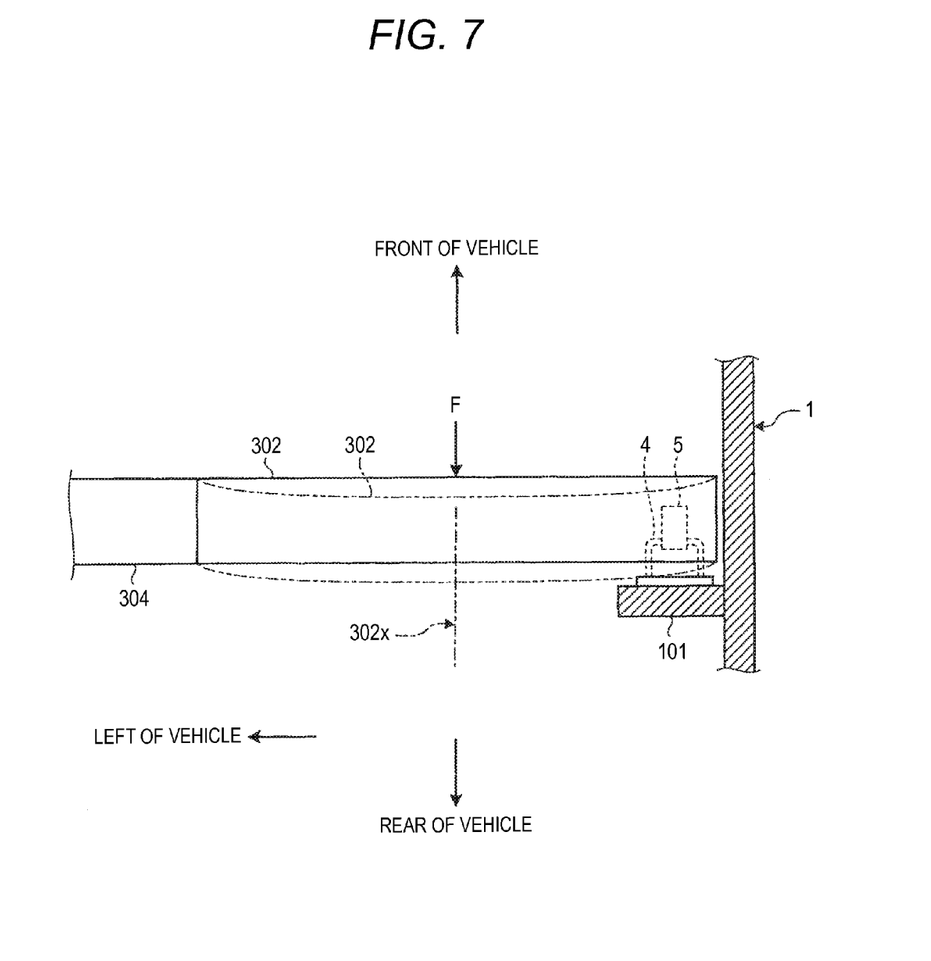
FIG. 7 is a schematic drawing which shows an example of a state in which a pressing load is applied to a seatback from a front side of the vehicle.

FIG. 7 is a schematic drawing which shows an example of a state in which a pressing load is applied to the seatback from the front side of the vehicle.

In the seat lock apparatus 5 which restrains the striker 4, as shown in FIGS. 3 to 5, only the deepest surface portion 10A1 of the first striker entrance groove 10A which is positioned in one of the body 10 and the base plate 11 which make up the case member and which is separated in the axial direction of the hook shaft 15 by the hook lever 12 acting as a boundary therebetween is in abutment with the striker 4. This seat lock apparatus 5 is mounted on the seatback frame 302a in the position at a right end portion of the seatback 302 in the left-to-right direction of the vehicle in such an orientation that the axial direction of the hook shaft 15 is directed in the left-to-right direction of the vehicle. Additionally, as shown in FIGS. 2 and 5, the seat lock apparatus 5 is mounted on the seatback frame 302a in such an orientation that the first striker entrance groove 10A is positioned closer to the center 302x of the seatback 302 than the hook lever 12 is to the center 302x in the axial direction of the hook shaft 15.

With the seat lock apparatus 5 mounted in such a position and orientation, when a pressing load is applied to the seatback 302 from the front side of the vehicle, for example, as a result of the passenger leaning against the seatback 302 which is in an erected state, the seatback 302 deflects towards the rear side of the vehicle as shown in FIG. 7. As this occurs, the seat lock apparatus 5 which restrains the striker 4 is inclined relative to the restrained portion 4A of the striker 4 on the deepest surface portion 10A1 of the first striker entrance groove 10A as a fulcrum in such a way that the hook lever 12 and the base plate 11 move towards the front side of the vehicle.

With the striker 4 restrained, the striker 4 resides forwards of the hook lever 12 towards the front side of the vehicle, and the engagement surface 12A of the hook lever 12 is in abutment with the striker 4. According thereto, even though the seat lock apparatus 5 is inclined relative to the striker 4 as a result of the pressing load being applied to the seatback 302 from the front side of the vehicle, the hook lever 12 is held in abutment with the striker 4. Additionally, the seat lock apparatus 5 has no member which is brought into abutment with the striker 4 from the front side of the vehicle in a position which lies farther away from the center 302x of the seatback 302 in the left-to-right direction of the vehicle than the hook lever 12 in such a state that no pressing load is applied to the seatback 302 from the front side of the vehicle. Therefore, when the seatback 302 deflects as a result of the application of the pressing load from the front side of the vehicle, there occurs no such a situation that the portion of the case member (the body 10 and the base plate 11) which is in abutment with the striker 4 moves away from the striker 4. Consequently, when the seatback 302 which has deflected as a result of the pressing load being applied thereto from the front side of the vehicle is restored to its original state, there occurs no such a situation that the portion of the case member which is spaced apart from the striker 4 is brought into abutment with the striker 4. Consequently, when the pressing load is applied to the seatback 302 of the rear seat 3 which is in the sitting state from the front side of the vehicle, too, the generation of a striking noise is prevented which would otherwise be caused as a result of the abutment of the seat lock apparatus 5 with the striker 4.

Additionally, there may be a case where a pressing load is applied to the seatback 302 which is erected from the rear side of the vehicle as a result of luggage stored in the trunk TR being brought into abutment therewith. As this occurs, the seat lock apparatus 5 is inclined from the state shown in FIG. 5 relative to the restrained portion 4A of the striker 4 on the abutment portion between the engagement surface 12A of the hook lever 12 and the striker 4 as a fulcrum in such a way that the deepest surface portion 10A1 of the first striker entrance groove 10A moves towards the front side of the vehicle. As this occurs, since the deepest surface portion 10A1 of the first striker entrance groove 10A moves in a direction in which the deepest surface portion 10A1 moves away from the striker 4, the deepest surface portion 10A1 of the first striker entrance groove 10A is prevented from striking the striker 4 strongly. This prevents the deepest surface portion 10A1 of the first striker entrance groove 10A which is provided in the body 10 which is the resin member from being deformed or damaged by being struck strongly by the striker 4.

Further, since the first striker entrance groove 10A which restrains the striker 4 together with the hook lever 12 is provided in the body 10 which is the resin member, an abutment noise can be reduced which is generated by the striker 4 and the deepest surface portion 10A1 of the first striker entrance groove 10A when the seatback 302 is erected. Moreover, the second striker entrance groove 11A in the base plate 11 is formed such that the restrained portion 4A of the striker 4 is not brought into abutment with the base plate 11 even though the axis 4Ax of the restrained portion 4A of the striker 4 is inclined from the rotating axis 12x of the hook lever 12 towards the deepest surface portion 11A1 of the second striker entrance groove 11A. According thereto, even though the seatback 302 deflects when the seatback 302 is erected, the generation of an abutment noise, which would otherwise be caused by the striker 4 having entered the second striker entrance groove 11A being brought into abutment with the base plate 11, can be prevented.

Figure 8:
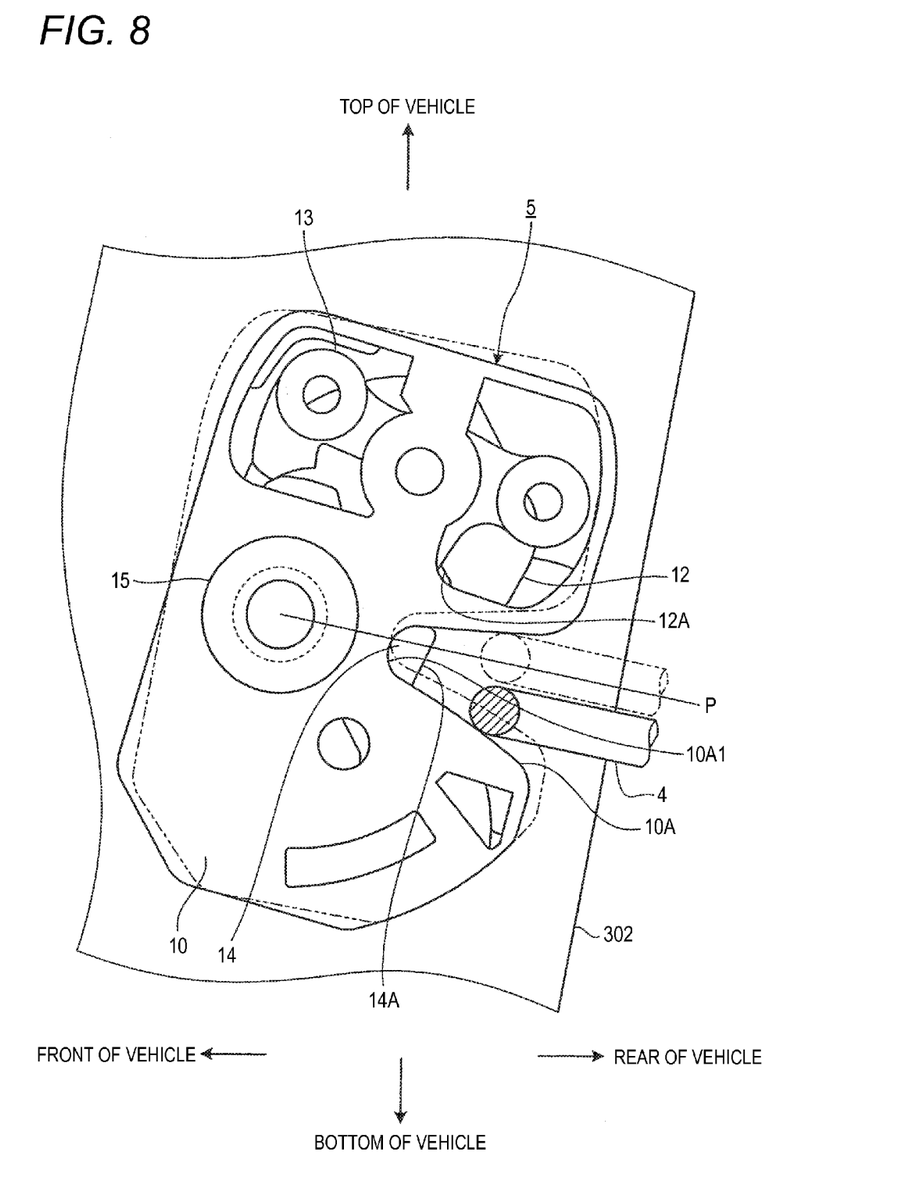
FIG. 8 is a schematic drawing which illustrates another advantage provided by the seat lock apparatus of this illustrative embodiment.

FIG. 8 is a schematic drawing which illustrates another advantage of the seat lock apparatus of this illustrative embodiment.

The seat lock apparatus 5 of this illustrative embodiment is mounted on the seatback frame 302a via the hook shaft 15. The hook shaft 15 is provided rotatably in the body 10 and the base plate 11. Namely, the seat lock apparatus 5 is mounted on the seatback frame 302a in such a state that the seat lock apparatus 5 can rotate on the hook shaft 15 as a rotating shaft.

When the seat lock apparatus 5 is mounted on the seatback frame 302a, the mounting position is determined, as shown in FIG. 3, such that the striker 4 is brought into abutment with the body 10 at the deepest surface portion 10A1 of the first striker entrance groove 10A. However, there occurs a case where the entrance position of the striker 4 into the first striker entrance groove 10A deviates in a widthwise direction of the first striker entrance groove 10A due to a tolerance with respect to the mounting position of the seat lock apparatus 5 and the striker 4 or the like. In view of this problem, as in the seat lock apparatus 5 shown in FIG. 3, in the event that the first striker entrance groove 10A is formed so as to gradually increase in width as it extends from the deepest surface portion 10A1 towards the striker entrance port, even in the event that the entrance position of the striker 4 deviates in the widthwise direction, the entrance of the striker 4 into the first striker entrance groove 10A is permitted.

In addition, as shown in FIG. 8, when the striker 4 enters the first striker entrance groove 10A with the entrance position of the striker 4 deviating largely from a reference entrance position P towards a bottom of the vehicle, the striker 4 is brought into abutment with a side surface of the first striker entrance groove 10A before it reaches the deepest surface portion 10A1 of the first striker entrance groove 10A. As this occurs, the body 10 (the seat lock apparatus 5) rotates on the hook shaft 15 as a rotating shaft in a clockwise direction in FIG. 8 as a result of a pressing load being applied thereto from the striker 4 which is brought into abutment with the side surface of the first striker entrance groove 10A. In FIG. 8, the position of the seat lock apparatus 5 which results before the striker 4 enters the first striker entrance groove 10A is indicated by a two-dot chain line.

When the body 10 rotates on the hook shaft 15 as the rotating shaft in the way described above, the orientation of the first striker entrance groove 10A is changed, whereby the striker 4 is allowed to move to and reach the deepest surface portion 10A1 of the first striker entrance groove 10A. This enables the striker 4 to press the striker abutment portion 14A of the guide lever 14, whereby the hook lever 12 moves to the restraining position. Consequently, even in the event that the entrance position of the striker 4 deviates in the widthwise direction of the first striker entrance groove 10A, the striker 4 can be restrained in an ensured fashion, thereby making it possible to increase a meshing permitting margin.

Further, as shown in FIG. 5, when the seat lock apparatus 5 is mounted in such a state that the flange 15A which is provided on the hook shaft 15 is interposed between the bottom surface of the body 10 and the seatback frame 302a so as to define a gap therebetween, it is possible to prevent the failure of rotation or the generation of abnormal noise that would otherwise be caused by friction caused between the body 10 (the seat lock apparatus 5) and the seatback frame 302a.

In addition, the seat lock apparatus 6 which is provided on the seatback 304 which is provided on the left-hand side of the vehicle is configured laterally symmetrically with the seat lock apparatus 5 in configuration in the axial direction of the hook shaft 15 (the left-to-right direction of the vehicle) in such a state that the seat lock apparatus 6 is mounted on the seatback 304. By adopting this configuration, the same advantage as that obtained on the seatback 302 can be obtained on the seatback 304.

Thus, as has been described heretofore, according to the seat lock apparatus of this illustrative embodiment, it is possible to prevent the generation of abnormal noise which is caused by the abutment of the seat lock apparatus 5 with the striker 4 when the pressing load is applied to the seatback 302 from the front side of the vehicle in such a state that the striker 4 which is provided on the vehicle main body 1 is restrained by the seat lock apparatus 5 which is mounted on the seatback 302.

In addition, according to the seat lock apparatus of this illustrative embodiment, it is possible to prevent the strong striking of the seat lock apparatus 5 against the striker 4 that would result when the pressing load is applied to the seatback 302 from the rear side of the vehicle in such a state that the striker 4 which is provided on the vehicle main body 1 is restrained by the seat lock apparatus 5 which is mounted on the seatback 302.

Further, according to the seat lock apparatus of this illustrative embodiment, even in the event that the entrance position of the striker 4 deviates in the widthwise direction of the first striker entrance groove 10A, it is possible to restrain the striker 4 in an ensured fashion, thereby making it possible to increase the meshing permitting margin.

It is noted that the invention is not limited to the configuration proposed in the above-described illustrative embodiment, and hence, the invention can be altered as required without departing from the spirit and scope of the invention.

For example, the seat lock apparatus 5 may be configured such that the open end portion of the body 10 is not covered by the base plate 11. In this case, too, in the event that the seat lock apparatus 5 is mounted on the seatback frame 302a in such an orientation that the first striker entrance groove 10A is positioned closer to the center of the seatback 302 in the left-to-right direction of the vehicle than the hook lever 12 is to the center, the advantage described in the above-described illustrative embodiment is obtained. It is noted that covering the open end portion of the body 10 with the base plate 11 in the way described in the illustrative embodiment, it is possible to protect the hook lever 12 which is accommodated in the case member (the body 10 and the base plate 11) or the like. In addition, in the event that the open end portion of the body 10 is covered with the base plate 11 and one end portion of the hook shaft 15 is inserted through the hook shaft insertion hole 11B in the base plate 11, it is possible to prevent the deformation of the hook shaft insertion hole 10B in the body 10, for example, when the seatback 302 deflects.

Additionally, the orientation of the seat lock apparatus 5 is not limited to the orientation in which the axial direction of the hook shaft 15 follows the left-to-right direction of the vehicle and hence can be altered as required. For example, even in the event that the seat lock apparatus 5 is oriented such that the axial direction of the hook shaft 15 follows a vertical direction of the seatback 302 which is erected, an advantage as described in the above-described illustrative embodiment can be obtained so long as the seat lock apparatus 5 is provided such that the first striker entrance groove 10A is positioned closer to the center of the seatback 302 than the hook lever 12 is to the center in the axial direction of the hook shaft 15.

Figure 9:
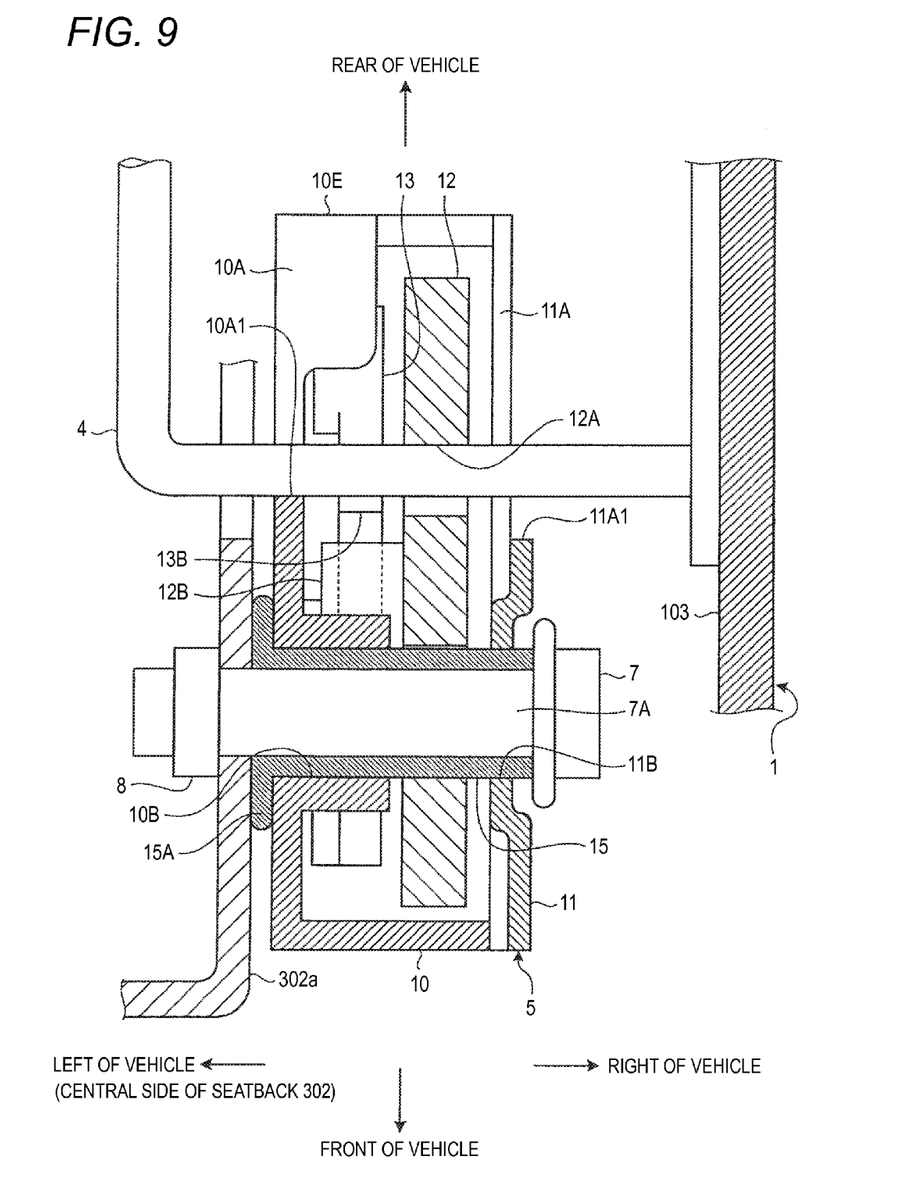
FIG. 9 is a sectional view which shows a modified example of a striker mounting method.

In addition, as shown in FIG. 9, the striker 4 may be provided in such an orientation that the striker 4 projects from an end face (a side surface) 103 of the vehicle main body 1 in the left-to-right direction of the vehicle towards the center of the vehicle. FIG. 9 is a sectional view which shows a modified example of a striker mounting method and which corresponds to the sectional view taken along the line V-V in FIG. 3. In this case, the hook lever 12 of the seat lock apparatus 5 can be disposed so as to be in the vicinity of the end face 103 of the vehicle main body 1 which is a striker mounting surface. Accordingly, the moment applied to the striker 4 via the hook lever 12 when the pressing load is applied to the seatback 302 from the rear side of the vehicle can be reduced, thereby making it possible to increase the strength to a higher degree.

In addition, the seat lock apparatus 5 may be mounted on a surface which is oriented inboards (towards the center 302x of the seatback 302 in FIG. 2) of the seatback frame 302a which is incorporated in the seatback 302.

Further, the seatback to which the seat lock apparatus 5 is applied is not limited to that of the seat of the vehicle which incorporates the internal trunk access function and hence may be applied to a seatback of a rear seat in a station wagon. In addition, the seatback to which the seat lock apparatus 5 is applied is not limited to the seatback which can move in the front-to-rear direction of the vehicle and hence may be applied to a seatback which can move in the left-to-right direction of the vehicle. Also in this case, by providing the seat lock apparatus 5 such that the first striker entrance groove 10A is positioned closer to the center of the seatback than the hook lever 12 is to the center in the axial direction of the hook shaft 15, it is possible to prevent the generation of a striking noise when a pressing load is applied to the seatback in the left-to-right direction of the vehicle.

Additionally, the seat lock apparatus 5 according to the invention is not limited to the seat in which the seatback (the backrest side cushion) 302 can move relative to the vehicle main body and hence can be applied to a seat in which a seat cushion (a sitting side cushion) 301 can move relative to the vehicle main body. Also in this case, by providing the seat lock apparatus 5 at an end portion of the seat cushion and such that the first striker entrance groove 10A is positioned closer to the center of the seat cushion than the hook lever 12 is to the center in the axial direction of the hook shaft 15, it is possible to prevent the generation of a striking noise when a pressing load is applied to the seat cushion.

The stowed state of the seat to which the seat lock apparatus 5 is applied does not have to be the state in which the seatback 302 (the movable cushion) is superposed on the seat cushion 301 as described in the illustrative embodiment, as long as the movable cushion can be moved to a different position from the position where the movable cushion is positioned when the rear seat 3 is in the sitting state. The stowed state may be, for example, a state in which the seat cushion 301 is erected from the sitting state relative to the floor of the vehicle main body 1 while the positional relationship between the seat cushion 301 and the seatback 302 is maintained. Additionally, the stowed state may be, for example, a state in which the seatback 302 is folded down to an opposite side to the seat cushion 301 with the seat cushion 301 erected relative to the floor of the vehicle main body 1.

What is claimed is:

1. A seat lock apparatus for a seat, wherein the seat comprises a sitting side cushion and a backrest side cushion, either one of which is configured as a movable cushion that is movable relative to a vehicle main body, and wherein the seat is put in a sitting state in a case where the movable cushion is held to the vehicle main body and is put in a stowed state in a case where the movable cushion is moved away from the vehicle main body, the seat lock apparatus being mountable onto a frame that is incorporated in the movable cushion, the seat lock apparatus comprising:
    a case member, which is provided on either one of an end portion of the movable cushion and the vehicle main body, and which comprises a striker entrance groove, wherein a striker provided on the other one of the end portion of the movable cushion and the vehicle main body enters the striker entrance groove when the seat is put in the sitting state and wherein the case member comprises:
    a first case member facing the frame; and
    a second case member opposite to the first case member; and
    a hook lever that is provided rotatably in the case member via a hook shaft and is configured to be movable between an opening position where the hook lever opens an opening in the striker entrance groove and a restraining position where the hook lever closes the opening in the striker entrance groove,
    wherein the seat lock apparatus is configured to hold the striker, which has entered the striker entrance groove in a case of putting the seat in the sitting state, by the case member and the hook lever that is positioned in the restraining position such that the movable cushion is maintained in the sitting state, and
    wherein the striker entrance groove is formed such that only a portion of the first case member, which is positioned closer to a central side of the movable cushion than the hook lever is to the central side of the movable cushion in an axial direction of the hook shaft, is brought into abutment with the striker while a portion of the second case member is separated from the striker in the case where the striker is held by the case member and the hook lever positioned in the restraining position.

2. The seat lock apparatus according to claim 1,
    wherein the striker entrance groove of the case member comprises:
    a first striker entrance groove positioned on one side of the hook lever in the axial direction of the hook shaft; and
    a second striker entrance groove positioned on the other side of the hook lever in the axial direction of the hook shaft,
    wherein the first striker entrance groove is formed such that when the striker enters the first striker entrance groove to be brought into abutment with the hook lever that is positioned in the restraining position, the striker is brought into abutment with a deepest surface portion of the first striker entrance groove,
    wherein the second striker entrance groove is formed such that a distance from a striker entrance surface, which configures a striker entrance port of the case member, to a deepest surface portion of the second striker entrance groove is longer than a distance from the striker entrance surface to the deepest surface portion of the first striker entrance groove,
    wherein the second striker entrance groove is formed to have a width which permits the striker to move to and reach the deepest surface portion of the first striker entrance groove, and
    wherein the first striker entrance groove is positioned closer to the center of the movable cushion than the hook lever is to the center of the movable cushion.

3. The seat lock apparatus according to claim 2,
    wherein the case member comprises a body made from resin, and
    wherein the first striker entrance groove is formed in the body.

4. The seat lock apparatus according to claim 2, further comprising:
    an opening lever provided between the first striker entrance groove and the second striker entrance groove in the axial direction of the hook shaft and configured to move the hook lever, which is positioned in the restraining position, to the opening position,
    wherein the hook lever is positioned between the opening lever and the second striker entrance groove in the axial direction of the hook shaft.

5. The seat lock apparatus according to claim 1, wherein:
    the striker entrance groove is configured to receive the striker to allow the striker to pass through the striker entrance groove toward the center of the movable cushion in the axial direction of the hook shaft.

6. The seat lock apparatus according to claim 1, wherein the hook lever is provided closer to the second case member than the first case member in the axial direction of the hook shaft.

* * * * *